United States Patent
Choi et al.

(10) Patent No.: US 12,453,619 B2
(45) Date of Patent: Oct. 28, 2025

(54) DIGITAL TOOTH SETUP METHOD USING GRAPHIC USER INTERFACE FOR TOOTH SET UP, AND DEVICE THEREFOR

(71) Applicant: OSSTEM IMPLANT CO., LTD., Seoul (KR)

(72) Inventors: Kyoo Ok Choi, Seoul (KR); Hwa Sam Kim, Gimpo-si (KR); Hye Ri Yoo, Seoul (KR)

(73) Assignee: OSSTEM IMPLANT CO., LTD., Seoul (KR)

( * ) Notice: Subject to any disclaimer, the term of this patent is extended or adjusted under 35 U.S.C. 154(b) by 253 days.

(21) Appl. No.: 18/036,505

(22) PCT Filed: Nov. 17, 2021

(86) PCT No.: PCT/KR2021/016909
§ 371 (c)(1),
(2) Date: May 11, 2023

(87) PCT Pub. No.: WO2022/131585
PCT Pub. Date: Jun. 23, 2022

(65) Prior Publication Data
US 2023/0397973 A1    Dec. 14, 2023

(30) Foreign Application Priority Data
Dec. 18, 2020 (KR) ........................ 10-2020-0178323

(51) Int. Cl.
*A61C 7/00* (2006.01)
*G16H 20/40* (2018.01)
*G16H 30/20* (2018.01)

(52) U.S. Cl.
CPC ............. *A61C 7/002* (2013.01); *G16H 20/40* (2018.01); *G16H 30/20* (2018.01); *A61C 2007/004* (2013.01)

(58) Field of Classification Search
CPC .. A61C 7/002; A61C 2007/004; G16H 20/40; G16H 20/30; G16H 30/20; G16H 30/40; G16H 30/00; G16H 50/50
(Continued)

(56) References Cited

U.S. PATENT DOCUMENTS

| | | |
|---|---|---|
| 9,433,476 B2 | 9/2016 | Khardekar et al. |
| 10,595,965 B2 | 3/2020 | Khardekar et al. |

(Continued)

FOREIGN PATENT DOCUMENTS

| | | |
|---|---|---|
| KR | 10-2016-0004863 A | 1/2016 |
| KR | 10-2016-0004864 A | 1/2016 |

(Continued)

OTHER PUBLICATIONS

Extended European search report issued on Oct. 21, 2024, in counterpart European Patent Application No. 21906890.5 (13 pages).

*Primary Examiner* — Prabodh M Dharia
(74) *Attorney, Agent, or Firm* — NSIP Law

(57) ABSTRACT

Disclosed are a digital tooth setup method using a graphical user interface for tooth setup and a device therefor. The digital tooth setup method according to an embodiment can dispose, on a loop-shaped guide interface, a manipulator including at least one of a tooth fine-adjustment interface and an interface for a treatment technique. Therefore, use convenience can be increased when teeth are set up by using the manipulator.

16 Claims, 14 Drawing Sheets

(58) Field of Classification Search
USPC .............................. 345/418; 703/1; 433/24
See application file for complete search history.

(56) References Cited

U.S. PATENT DOCUMENTS

| | | | | |
|---|---|---|---|---|
| 2004/0197727 | A1* | 10/2004 | Sachdeva | A61C 7/00 |
| | | | | 433/24 |
| 2009/0098502 | A1* | 4/2009 | Andreiko | A61C 7/002 |
| | | | | 433/24 |
| 2010/0036682 | A1* | 2/2010 | Trosien | G16H 20/30 |
| | | | | 705/3 |
| 2013/0231899 | A1* | 9/2013 | Khardekar | G06F 30/00 |
| | | | | 703/1 |
| 2013/0325431 | A1* | 12/2013 | See | A61C 7/002 |
| | | | | 703/11 |
| 2016/0367339 | A1 | 12/2016 | Khardekar et al. | |
| 2017/0100212 | A1* | 4/2017 | Sherwood | A61C 7/002 |
| 2018/0185120 | A1* | 7/2018 | Wool | A61C 7/22 |
| 2020/0004402 | A1* | 1/2020 | Makarenkova | G06F 3/04815 |
| 2020/0268484 | A1 | 8/2020 | Khardekar et al. | |
| 2021/0068773 | A1* | 3/2021 | Moshe | A61N 5/103 |

FOREIGN PATENT DOCUMENTS

| | | |
|---|---|---|
| KR | 10-1913834 B1 | 10/2018 |
| KR | 10-2018-0136291 A | 12/2018 |
| KR | 10-2086685 B1 | 3/2020 |
| KR | 10-2020-0113449 A | 10/2020 |
| KR | 10-2179777 B1 | 11/2020 |
| KR | 10-2020-0144753 A | 12/2020 |
| WO | WO 2007/101245 A2 | 9/2007 |

* cited by examiner

FIG. 7

| Movement Classification | | Collision Compensation | Collision Ignoring |
|---|---|---|---|
| Rotation | Angulation | 1-a | 2-a |
| | Rotation | 1-b | 2-b |
| | Torque | 1-c | 2-c |
| Move-ment | Mesial/Distal | 1-d | 2-d |
| | Intrusion/Extrusion | 1-e | 2-e |
| | Buccal/Lingual | 1-f | 2-f |

DIGITAL TOOTH SETUP METHOD USING GRAPHIC USER INTERFACE FOR TOOTH SET UP, AND DEVICE THEREFOR

CROSS REFERENCE TO RELATED APPLICATIONS

This application is a U.S. National Stage Application of International Application No. PCT/KR2021/016909, filed on Nov. 17, 2021, which claims the benefit under 35 USC 119(a) and 365(b) of Korean Patent Application No. 10-2020-0178323, filed on Dec. 18, 2020, in the Korean Intellectual Property Office, the entire disclosure of which is incorporated herein by reference for all purposes.

TECHNICAL FIELD

The present invention relates to an image analysis and processing technology, and more specifically, to a digital dental diagnosis and treatment plan establishment technology through image analysis.

BACKGROUND ART

Dental treatment (e.g., orthodontics, prosthetics, dentures, etc.) using digital dental software proceeds with patient data acquisition, treatment plan establishment, device (e.g., prosthesis) fabrication, treatment, treatment result confirmation, or similar processes. For orthodontics among these processes, prior to orthodontic treatment, it is required to set up teeth in an ideal form by establishing an orthodontic diagnosis and treatment plan from data of a patient.

In the process of setting up teeth using dental software, manipulators may be displayed for individual teeth of image data of a patient shown on a screen, and a user may rotate or move the individual teeth by manipulating the manipulators displayed on the screen. In the case in which tooth movement or tooth rotation is required, when the user selects and manipulates an individual tooth, the tooth movement according to the user's manipulation is visualized and displayed on the screen.

Meanwhile, in the case in which functions such as tooth extraction, interproximal reduction (IPR), tooth fixation, and the like, which are major orthodontic techniques, are required, it is necessary to perform a corresponding function by entering a separate page separately from the tooth movement and rotation steps.

DISCLOSURE

Technical Problem

The present invention is directed to providing a digital tooth setup method which is capable of minimizing additional manipulation by a user and increasing convenience of use upon user manipulation on dental software, and a device therefor.

Technical Solution

One aspect of the present invention provides a digital tooth setup method performed by a digital tooth setup device, which includes displaying dental image data, receiving a selection input of a predetermined tooth by a user's manipulation on the displayed dental image data, displaying a plurality of manipulators for at least one of a fine adjustment function and a treatment technique function on a loop-shaped guide interface around the selected tooth, and performing tooth setup using the plurality of manipulators, wherein the fine adjustment function includes at least one of tooth movement and tooth rotation, and the treatment technique function includes at least one of tooth extraction, tooth fixation, and interproximal reduction.

In the displaying of the manipulators, a tooth movement interface and a tooth rotation interface may be divided into a collision compensation interface for compensating for a collision of the selected tooth with an adjacent tooth and a collision ignoring interface for ignoring compensation for the collision of the selected tooth with the adjacent tooth and displayed.

In the displaying of the manipulators, the collision compensation interface and the collision ignoring interface may be displayed at positions symmetrical with each other with respect to a center of the guide interface.

In the displaying of the manipulators, at least one image of a tooth front image, a tooth occlusal surface image, and a tooth side image may be displayed, and the manipulators may be displayed in each image.

In the displaying of the manipulators, at least two images of a tooth front image, a tooth occlusal surface image, and a tooth side image may be displayed together, and the manipulators may be displayed in each image, and in the performing of the tooth setup using the manipulators, when the manipulator in a predetermined image is manipulated by the user's manipulation, a result of the manipulation may be reflected to at least one other image in real time and displayed.

The performing of the tooth setup using the manipulators may include performing tooth fine adjustment on the selected tooth using the manipulators by the user's manipulation, determining whether the selected tooth collides with an adjacent tooth during the tooth fine adjustment, and reflecting an expected collision upon collision and compensating for an amount of movement of the adjacent tooth. The performing of the tooth setup using the manipulators may further include visualizing and displaying a collision direction and overlapping amount when a collision occurs between the selected tooth and the adjacent tooth.

In the performing of the tooth setup using the manipulators, when the selected tooth collides with an adjacent tooth during fine adjustment of the selected tooth, compensation movement may be performed on the adjacent tooth in the same direction as the selected tooth along an arch line by an overlapping amount within a range in which the selected tooth collides with the adjacent tooth.

In the displaying of the manipulators, positions of rotational center point candidates around which rotation movement will be performed to rotate the selected tooth using the manipulators may be displayed, and in the performing of the tooth setup using the manipulators, a predetermined rotational center point may be selected from among the displayed rotational center point candidates by the user's manipulation and the selected tooth may be rotated around the selected rotational center point.

In the displaying of the manipulators, positions of rotational center point candidates around which rotation movement will be performed to rotate the selected tooth using the manipulators may be displayed, and a preset basic center point among the center point candidates may be suggested, and in the performing of the tooth setup using the manipulators, the preset basic rotational center point may be changed to another predetermined rotational center point among the displayed rotational center point candidates by the user's manipulation, and the selected tooth may be rotated around the changed rotational center point.

In the displaying of the manipulators, an interface for tooth extraction may be displayed, and in the performing of the tooth setup using the manipulators, when the interface for tooth extraction for the selected tooth is selected by the user's manipulation, the selected tooth may be deleted and a portion in which the selected tooth is deleted may be displayed as an empty space.

In the displaying of the manipulators, an interface for tooth fixation may be displayed, and in the performing of the tooth setup using the manipulators, when the interface for tooth fixation for the selected tooth is selected by the user's manipulation, the selected tooth may be fixed.

In the displaying of the manipulators, an interface for interproximal reduction may be displayed, and in the performing of the tooth setup using the manipulators, when an amount of interproximal reduction is input through the interface for interproximal reduction for the selected tooth by the user's manipulation, at least one of mesial and distal proximal surfaces of the selected tooth may be deleted by the input amount of interproximal reduction and displayed.

The interface for interproximal reduction may include at least one of a text box interface for receiving a deletion value from the user, and an increase/decrease interface for increasing and/or decreasing the amount of interproximal reduction through user selection.

The performing of the tooth setup using the manipulators may further include at least one of displaying the selected tooth and a tooth width that is changed after the interproximal reduction together with the interproximal reduction, and analyzing the tooth width that is changed after the interproximal reduction and providing a result of the analysis.

Another aspect of the present invention provides a digital tooth setup method performed by a digital tooth setup device, which includes displaying dental image data, receiving a selection input of a tooth by a user's manipulation on the displayed dental image data, displaying a tooth fine-adjustment interface including at least one of a tooth movement interface and a tooth rotation interface on a loop-shaped guide interface around the selected tooth, performing tooth fine adjustment using the tooth fine-adjustment interface by the user's manipulation, determining whether the selected tooth collides with an adjacent tooth during the tooth fine adjustment, and reflecting an expected collision upon collision and compensating for an amount of movement of the adjacent tooth.

Still another aspect of the present invention provides a digital tooth setup device which includes an output unit configured to display a screen including dental image data, an input unit configured to receive a user manipulation signal, and a control unit configured to, when a selection input of a predetermined tooth is received by user's manipulation on the dental image data displayed on the screen through the input unit, display a plurality of manipulators for at least one of a fine adjustment function and a treatment technique function on a loop-shaped guide interface around the selected tooth through the output unit, and perform tooth setup using the plurality of manipulators, wherein the fine adjustment function includes at least one of tooth movement and tooth rotation, and the treatment technique function includes at least one of tooth extraction, tooth fixation, and interproximal reduction.

Advantageous Effects

According to a digital tooth setup method using manipulators according to an embodiment, and a device therefor, the manipulators can be arranged on a loop-shaped guide interface, and thus, when a user manipulates the manipulators, additional manipulation by the user can be minimized and convenience of use can be increased.

When moving an individual tooth using the manipulator, an expected collision with an adjacent tooth can be visualized and displayed, the adjacent tooth to which the expected collision is reflected can be moved together with the tooth, and thus additional manipulation by a user can be minimized and convenience of use can be increased. For example, there is no need for a procedure to additionally move the adjacent tooth because of the collision with the adjacent tooth when the individual tooth is moved or rotated. A tooth setup process may be easily performed based on actual tooth movement.

In the case of rotation of the selected tooth using the manipulator, results of tooth rotation are different depending on a rotational center point. When a position of the rotational center point is changed, the position of the rotational center point reflecting an actual tooth axis can be specified, and thus the user can check information on the rotational center point of the selected tooth and change the position of the rotational center point, thereby increasing convenience of use.

As another example, by including and providing an interface for performing a treatment technique (e.g., tooth extraction, interproximal reduction, or tooth fixation), it is possible to apply a fine adjustment function including tooth movement and tooth rotation and a treatment technique function within one screen in the same step. Accordingly, since the tooth fine adjustment and the treatment technique can be simultaneously applied, additional manipulation by the user can be reduced and convenience of use can be increased.

When teeth are set up using the manipulator, not only simple fine adjustment, but also tooth extraction, tooth fixation, and interproximal reduction, which are orthodontic treatment techniques, are applied, and thus the accuracy of a treatment plan and user convenience can be increased. Since the tooth movement and the treatment technique are applied simultaneously, treatment results similar to those of actual treatment can be expected.

When the teeth are set up using the manipulator, it is possible to apply the tooth fine adjustment and the treatment technique at the same step, and reduce a work procedure of software.

DESCRIPTION OF DRAWINGS

FIGS. 4 to 7 are views for describing a screen on which manipulators for tooth fine adjustment according to an embodiment of the present invention are displayed, and a tooth movement interface and a tooth rotation interface which are used during the tooth fine adjustment.

MODES OF THE INVENTION

Figure 1:
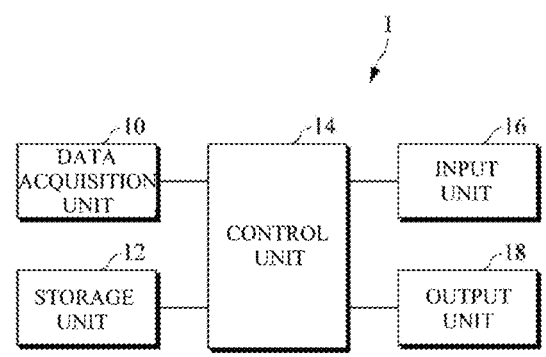
FIG. 1 is a diagram illustrating a configuration of a digital tooth setup device according to an embodiment of the present invention.

Advantages and features of the present invention and methods of achieving the same will be clearly understood with reference to the accompanying drawings and embodiments described in detail below. However, the present invention is not limited to the embodiments to be disclosed below but may be implemented in various different forms. The embodiments are provided in order to fully explain the present embodiments and fully explain the scope of the present invention for those skilled in the art. The scope of the present invention is only defined by the appended claims. Like reference numerals refer to like elements throughout the specification.

In addition, when the embodiments of the present invention are described, if it is determined that detailed descriptions of known technology related to the present invention unnecessarily obscure the subject matter of the present invention, detailed descriptions thereof will be omitted. Some terms described below are defined by considering functions in the present invention, and meanings may vary depending on, for example, a user or operator's intentions or customs. Therefore, the meanings of terms should be interpreted based on the scope throughout this specification.

In this case, it will be appreciated that each block of block diagrams and combinations of steps of flowcharts may be performed by computer program instructions (an execution engine). Since the computer program instructions may be loaded into a processor of a general-purpose computer, special purpose computer, or other programmable data processing devices, the instructions executed through the processor of the computer or other programmable data processing devices generate a means for performing the functions described in the block(s) of the block diagrams or the step(s) of the flowcharts.

Since the computer program instructions may be stored in a computer usable or computer readable memory that can be directed to a computer or other programmable data processing devices to implement functionality in a particular manner, the instructions stored in the computer usable or computer readable memory may produce a manufactured item containing an instruction means for performing the functions described in the block(s) of the block diagrams or the step(s) of the flowcharts.

Since the computer program instructions may also be installed in a computer or other programmable data processing devices, instructions for performing a series of operating steps on a computer or other programmable data processing devices to generate a computer-implemented process to be performed on the computer or other programmable data processing devices may provide steps for performing the functions described in the block(s) of the block diagrams or the step(s) of the flowcharts.

In addition, each block or step may represent a module, segment, or portion of code that includes one or more executable instructions for executing a specified logical function(s). It should also be noted that in some alternative implementations, the functions mentioned in the blocks or steps may occur out of order. For example, two blocks or steps illustrated in succession may in fact be executed substantially concurrently or the blocks may sometimes be executed in reverse order depending on the corresponding function.

Hereinafter, various embodiments of the present invention will be described in detail with reference to the accompanying drawings. However, the embodiments of the present invention may be modified in several different forms, and the scope of the present invention is not limited to the embodiments to be described below. The embodiments of the present invention are provided to fully explain the present invention to those skilled in the art.

FIG. 1 is a diagram illustrating a configuration of a digital tooth setup device according to an embodiment of the present invention.

Referring to FIG. 1, a digital tooth setup device 1 performs tooth setup design to help orthodontics, prosthesis, dentures, etc. in actual dentistry. The tooth setup design includes a series of processes of acquiring dental image data of a patient, establishing a treatment plan by performing simulation through diagnosis and analysis using the dental image data under the control of software, and producing virtual tooth setup data in which teeth are arranged according to the established treatment plan. The tooth setup may be applied to orthodontics, prosthetics, dentures, etc. The dental image data of the patient may include at least one piece of computed tomography (CT) data, oral cavity data, and physiognomic data or data acquired by matching two or more pieces of CT data, oral cavity data, and physiognomic data.

The digital tooth setup device 1 according to the embodiment may include an electronic device that can execute a tooth setup design program and a server that communicates with the electronic device through a network. Examples of the electronic device include computers, notebook computers, laptop computers, tablet personal computers (PCs), smartphones, mobile phones, personal media players (PMPs), personal digital assistants (PDAs), and the like.

Referring to FIG. 1, the digital tooth setup device 1 according to the embodiment includes a data acquisition unit 10, a storage unit 12, a control unit 14, an input unit 16, and an output unit 18.

The data acquisition unit 10 acquires dental image data from a patient. Dental image data required for treatment may include at least one piece of data of CT data, oral cavity data, and physiognomic data or data acquired by matching two or more pieces of the CT data, the oral cavity data, and the physiognomic data. Furthermore, the dental image data may further include cephalo-lateral photograph data, panoramic data, cephalometric X-ray data, posteroanterior (PA) X-ray photograph data, and the like.

Scan data is data having information on actual teeth including a damaged tooth. The scan data may be tooth model scan data acquired by scanning a gypsum model generated by imitating an oral cavity of the patient with a three-dimensional (3D) scanner. As another example, the scan data may be oral cavity scan data acquired by scanning an inside of the oral cavity of the patient using a 3D intra-oral scanner. The acquired scan data may be stored in the storage unit 12.

The CT data may be acquired by generating tomographic images of the patient's head using CT scanning, segmenting a boundary of a tooth in each tomographic image, and then combining the segmented images into one image. The scan data and the CT data include an image acquired by photographing maxillary teeth from under the maxillary teeth in the state in which the patient opens his or her mouth, an image acquired by photographing mandibular teeth from above the mandibular teeth in the state in which the patient opens his or her mouth, an image acquired by photographing a local area in the state in which the patient closes his or her mouth, an oral radiograph, etc. The acquired CT data may be stored in the storage unit 12. The CT data may be data in a 3D form. Soft tissue, which is external information on the face, skeletal structure, which is internal information, and oral information may be acquired using the CT data, and used in dental treatment.

Various types of data such as information necessary for operation of the digital tooth setup device 1, information generated according to the operation, and the like are stored in the storage unit 12. The storage unit 12 may provide data necessary for the data analysis by the control unit 14 to the control unit 14.

The output unit 18 displays a screen according to the operation of the control unit. For example, the output unit 18 may display the dental image data and a manipulator on the dental image data. A process of establishing an orthodontic treatment plan using dental software includes a process of completing the tooth setup through an operation of moving an individual tooth to a desired position, an operation of rotating the tooth, an operation of extracting the tooth, an operation of fixing the tooth, an operation of deleting the tooth, and the like, by manipulating the manipulator displayed on the dental image.

The input unit 16 receives a user manipulation signal. For example, the input unit 16 receives user manipulation signals for tooth movement, tooth rotation, tooth extraction, tooth fixation, interproximal reduction, and the like with respect to the tooth setup data displayed on the screen through the output unit 18.

When a selection input of a predetermined tooth is received by the user's manipulation through the input unit 16 on the dental image data displayed on the screen, the control unit 14 displays a manipulator that provides at least one of a fine adjustment function and a treatment technique function around the selected tooth through the output unit 18, and performs tooth setup using the manipulator. In this case, the user's manipulation to receive the selection input of the tooth may include an action such as clicking with an input tool such as a mouse or touching with a body part such as a finger, an action such as allowing a cursor of an input tool or a finger to stay on a corresponding tooth for a predetermined period of time or longer, or the like. Meanwhile, the fine adjustment function may include at least one of tooth movement and tooth rotation. The treatment technique function may include at least one of tooth extraction, tooth fixation, and interproximal reduction.

The control unit 14 may provide an interface for performing a treatment technique (e.g., tooth extraction, interproximal reduction, or tooth fixation) on a guide interface. In the case in which the treatment technique function is operated as a function separate from that of the guide interface, when a corresponding function needs to be applied, a separate page should be entered and the corresponding function should be performed. This is accompanied by the inconvenience of having to move through a number of screen steps, and causes a user's discomfort due to a decrease in continuity during work. In order to solve such a problem, the control unit 14 may provide the interface for performing the treatment technique (e.g., tooth extraction, interproximal reduction, or tooth fixation) on the guide interface, thereby solving the inconvenience of entering the separate screen step.

The control unit 14 may visualize and display an expected collision with an adjacent tooth when the selected tooth is finely adjusted using the manipulator, and also perform movement of the adjacent tooth reflecting the expected collision. When the dental image data is displayed with the collision with the adjacent tooth ignored during manipulation of the manipulator, a collision may occur between the moved tooth and the adjacent tooth when an individual tooth is moved and rotated to a position desired by the user. Additional movement of the individual tooth to compensate for the collision with the adjacent tooth is necessarily required, and problems such as a decrease in work speed and an increase in workload due to the tooth movement may occur despite the use of software.

In order to solve the above problems, the control unit 14 may visualize and display an expected collision with the adjacent tooth when the selected tooth is finely adjusted using the manipulator, and also perform movement of the adjacent tooth reflecting the expected collision. Accordingly, additional manipulation by the user is reduced and convenience of use is increased. For example, there is no need for a procedure to additionally move the adjacent tooth because of the collision with the adjacent tooth when the individual tooth is moved or rotated. A tooth setup process can be easily performed based on actual tooth movement.

The control unit 14 may set or change a position of a rotational center point in the case of rotating the selected tooth using the manipulator. For example, when the position of the rotational center point is changed, the position of the rotational center point reflecting an actual tooth axis may be specified, and thus the user may check information on the rotational center point of the selected tooth and change the position of the rotational center point, thereby increasing convenience of use.

In an embodiment, the control unit 14 may apply a fine adjustment function including tooth movement and tooth rotation and a treatment technique function within one screen in the same step. In this case, since the tooth fine adjustment and the treatment technique can be simultaneously applied, additional manipulation by the user is reduced and convenience of use is increased.

Figure 2:
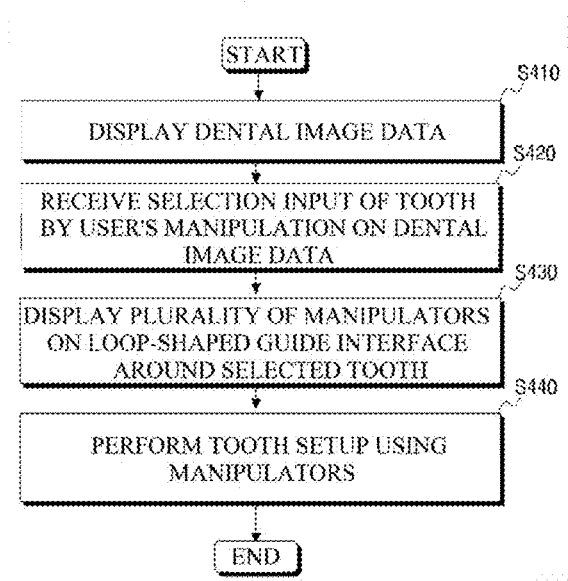
FIG. 2 is a flowchart illustrating a digital tooth setup method using a manipulator according to an embodiment of the present invention.

FIG. 2 is a flowchart illustrating a digital tooth setup method using a manipulator according to an embodiment of the present invention.

Referring to FIG. 2, a digital tooth setup device may display dental image data (S410), and receive a selection input of a tooth by the user's manipulation on the displayed dental image data (S420).

Next, the digital tooth setup device displays a plurality of manipulators for at least one of a fine adjustment function and a treatment technique function on a guide interface around the selected tooth (S430). Here, the guide interface is an interface for arranging the plurality of manipulators, and is configured in a loop shape around the tooth, and the plurality of manipulators are arranged on the loop.

The fine adjustment function includes at least one of tooth movement and tooth rotation, and the treatment technique function includes at least one of tooth extraction, interproximal reduction, and tooth fixation. The digital tooth setup device performs tooth setup using the manipulators (S440).

In operation S440 of performing the tooth setup using the manipulator, the digital tooth setup device may visualize and display an expected collision with an adjacent tooth when the individual tooth is moved using the manipulator, and also perform movement of the adjacent tooth reflecting the expected collision. Accordingly, additional manipulation by the user is reduced and convenience of use is increased. A tooth setup process can be easily performed based on actual tooth movement.

To this end, in operation S430 of displaying the manipulators on the guide interface, the digital tooth setup device may divide and display a tooth movement interface and a tooth rotation interface into a collision compensation interface and a collision ignoring interface. The collision compensation interface is an interface that compensates for the collision with the adjacent tooth when the selected tooth collides with the adjacent tooth, and the collision ignoring interface is an interface that does not compensate for the collision with the adjacent tooth by ignoring the collision even when the collision occurs.

In operation S440 of performing the tooth setup using the manipulators, the digital tooth setup device may perform tooth fine adjustment using the manipulators on the selected tooth by the user's manipulation. The digital tooth setup device may determine whether the selected tooth collides with the adjacent tooth when the tooth is finely adjusted, and the digital tooth setup device may compensate for an amount of movement of the adjacent tooth by reflecting an expected collision upon collision. Furthermore, the digital tooth setup device may visualize and display a collision direction and overlapping amount when the selected tooth collides with the adjacent tooth.

In operation S440 of performing the tooth setup using the manipulators, when the selected tooth collides with the adjacent tooth during the tooth fine adjustment of the selected tooth, the digital tooth setup device may perform compensation movement on the adjacent tooth in the same direction as the selected tooth along an arch line by an overlapping amount within a range (e.g., maxilla left, maxilla right, mandible left, or mandible right) in which the selected tooth collides with the adjacent tooth.

In operation S430 of displaying the manipulators, the digital tooth setup device may display positions of rotational center point candidates around which rotation movement will be performed to rotate the selected tooth using the manipulators. Then, in operation S440 of performing the tooth setup using the manipulators, the digital tooth setup device may select a predetermined rotational center point from among the displayed rotational center point candidates by the user's manipulation, and rotate the selected tooth around the selected rotational center point.

As another example, in operation S430 of displaying the manipulators, the digital tooth setup device may display positions of rotational center point candidates around which rotation movement will be performed to rotate the selected tooth using the manipulators, and suggest a preset basic center point among the center point candidates. Then, in operation S440 of performing the tooth setup using the manipulators, the digital tooth setup device may change the preset basic rotational center point to another predetermined rotational center point among the displayed rotational center point candidates by the user's manipulation, and rotate the selected tooth around the changed rotational center point.

In operation S430 of displaying the manipulators, the digital tooth setup device may display at least one image of a tooth front image, a tooth occlusal surface image, and a tooth side image, and display the manipulators in each image.

In operation S430 of displaying the manipulators, the digital tooth setup device may display at least two images of the tooth front image, the tooth occlusal surface image, and the tooth side image together, and display the manipulators in each image. Then, in operation S440 of performing the tooth setup using the manipulators, the digital tooth setup device may reflect and display a result of the manipulation to at least one other image in real time when the manipulator in a predetermined image is manipulated by the user's manipulation.

In operation S430 of displaying the manipulators, the digital tooth setup device may display at least one of an interface for tooth extraction, an interface for tooth fixation, and an interface for interproximal reduction.

There is a case in which tooth extraction or interproximal reduction is performed to secure a space when the teeth are set up for treatment, and there is a case in which residual teeth are moved after a tooth that will not be moved is fixed. In this case, a user interface for performing a treatment technique function may be included and displayed in the manipulator that performs the tooth fine adjustment. In this case, the tooth fine adjustment and the representative treatment technique may be applied at the same step. Therefore, it is possible to increase the continuity of work and reduce the hassle of moving between pages, thereby promoting convenience of the operator.

According to the process of performing the treatment technique function using the manipulator of the present invention, in operation S420 of receiving the selection input of the tooth, the digital tooth setup device receives a selection input of a tooth that requires a treatment technique by the user's manipulation. Then, in operation S430 of displaying the manipulators, the guide interface may be displayed around the selected tooth, and the manipulator including at least one of the interface for tooth extraction, the interface for tooth fixation, and the interface for interproximal reduction may be displayed near the guide interface. In operation S440 of performing the tooth setup using the manipulators, the digital tooth setup device receives a selection input of a predetermined treatment technique interface from among the treatment technique interfaces (e.g., an interface for tooth extraction, interface for tooth fixation, and interface for interproximal reduction) among the displayed manipulators, performs the selected treatment technique function, and displays a result of the performance on the screen.

As the result of the performance, in the case of tooth extraction, the selected tooth may be deleted and a portion in which the selected tooth is deleted may be displayed as an empty space, and the teeth may be arranged by moving or rotating the tooth using the space generated due to the tooth extraction. In the case of tooth fixation, when another interface, for example, a tooth movement interface or a tooth rotation interface, is operated after the selected tooth is fixed, the corresponding tooth is not moved. In the case of interproximal reduction, the teeth are deleted by the number of teeth input by the user and displayed. Further, even when the interproximal reduction is performed, the teeth may be arranged by moving or rotating the tooth in the space generated through deletion in the same way as the tooth extraction.

As described above, when the teeth are set up using the manipulator, the tooth fine adjustment and the tooth treatment technique function may be applied to the same screen, and thus the number of procedures can be reduced. For example, on one screen, a procedure of moving the tooth→confirming the adjacent tooth→changing the adjacent tooth or performing interproximal reduction may be performed.

Figure 3:
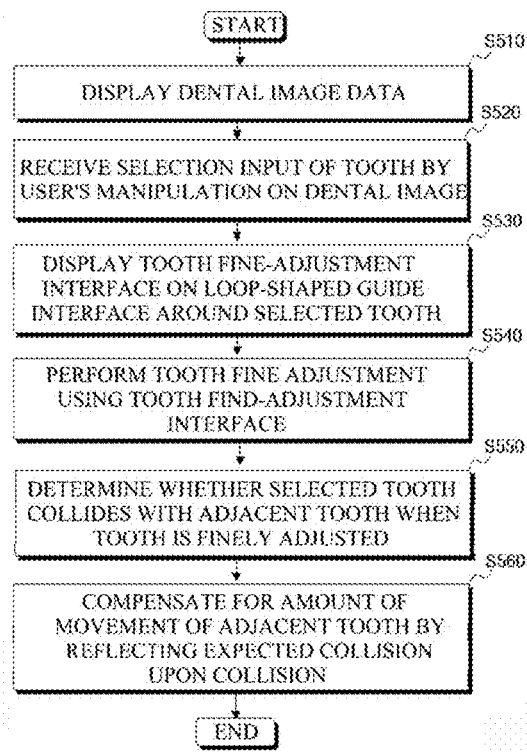
FIG. 3 is a flowchart illustrating a tooth fine adjustment method using a manipulator according to an embodiment of the present invention.

FIG. 3 is a flowchart illustrating a tooth fine adjustment method using a manipulator according to an embodiment of the present invention.

Referring to FIG. 3, a digital tooth setup device may display dental image data (S510), and receive a selection input of a tooth that requires fine adjustment by the user's manipulation on the displayed dental image data (S520). Next, a tooth fine-adjustment interface is displayed on a guide interface around the selected tooth (S530). The tooth fine-adjustment interface may include at least one of a tooth movement interface and a tooth rotation interface. Here, the guide interface is configured in a loop shape around the tooth, and the tooth fine-adjustment interface is disposed on the loop.

Next, the digital tooth setup device performs tooth fine adjustment using the tooth fine-adjustment interface by the user's manipulation (S540).

Next, the digital tooth setup device determines whether the selected tooth collides with an adjacent tooth when the tooth is finely adjusted (S550), and compensates for an amount of movement of the adjacent tooth by reflecting an expected collision upon collision (S560). For example, when the tooth is moved using the tooth movement interface by the user's manipulation, the digital tooth setup device may reflect an expected collision with the adjacent tooth and also perform movement of the adjacent tooth. In this case, the expected collision with the adjacent tooth may be visualized and displayed.

FIGS. 4 to 7 are views for describing a screen on which manipulators for tooth fine adjustment according to an embodiment of the present invention are displayed, and a tooth movement interface and a tooth rotation interface which are used during the tooth fine adjustment.

Figure 4:
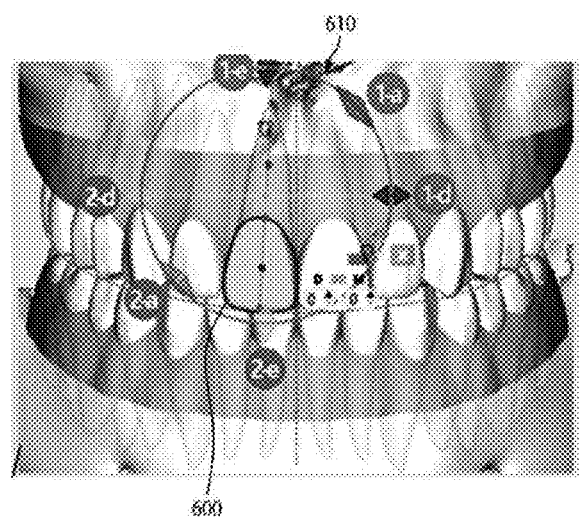
Figure 5:
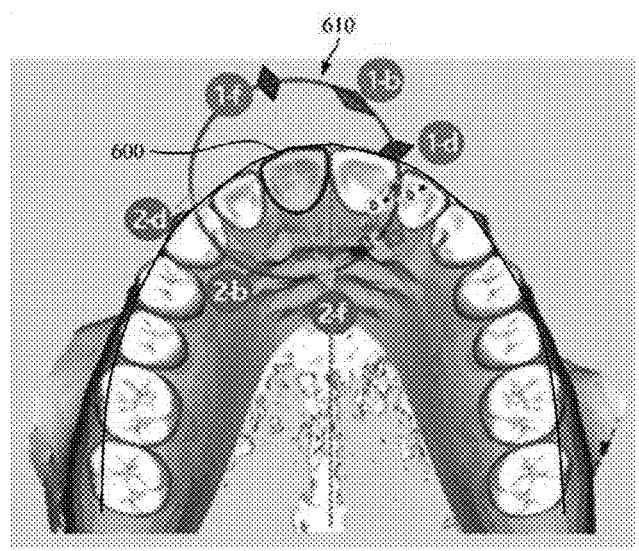
Figure 6:
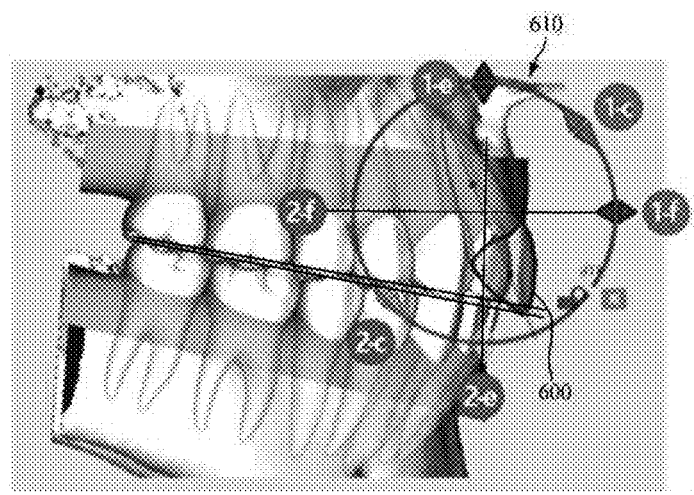

More specifically, FIG. 4 is a view showing a manipulator display screen on the front of a tooth, FIG. 5 is a view showing a manipulator display screen on a tooth occlusal surface, FIG. 6 is a view showing a manipulator display screen on a tooth side surface, and FIG. 7 is a view for describing a tooth fine-adjustment interface according to an embodiment of the present invention.

Referring to FIGS. 4 to 7, when a user selects a predetermined individual tooth 600, a guide interface 610 is displayed around the selected tooth 600. The guide interface 610 is an interface displayed on a screen to facilitate the user's manipulation for tooth setup on dental image data. The guide interface 610 may be configured in the form of a loop formed around a position of the selected tooth 600. The loop may have a circular shape, but the present invention is not limited thereto. The shape of the loop does not have to be a perfect circle around the selected tooth 600, and the loop may have any size as long as it is disposed near the individual tooth based on the selected tooth 600.

The tooth fine-adjustment interface may be disposed on the guide interface 610. The tooth fine-adjustment interface may include at least one of a tooth movement interface and a tooth rotation interface. The tooth movement interface is a user interface displayed on the screen for movement of the selected tooth 600. The tooth movement interface may include mesial and distal direction movement interfaces (forward and backward movement) 1-$d$ and 2-$d$, intrusion and extrusion direction movement interfaces (up and down movement) 1-$e$ and 2-$e$, and buccal and lingual direction movement interfaces (forward and narrow direction movement) 1-$f$ and 2-$f$.

The tooth rotation interface is a user interface displayed on the screen for rotation of the selected tooth 600. The tooth rotation interface may include angulation adjustment interfaces (frontal left and right rotation) 1-$a$ and 2-$a$, rotation adjustment interfaces (occlusal left and right rotation) 1-$b$ and 2-$b$, and torque adjustment interfaces (frontal forward and narrow rotation) 1-$c$ and 2-$c$.

As shown in FIGS. 4 to 6, the tooth movement interface and the tooth rotation interface may be provided in the form of a button with an arrow direction, but the present is not limited thereto. The tooth movement interface and the tooth rotation interface may be positioned on a loop formed to be spaced a preset distance around the position of the selected tooth 600.

When a mouse is positioned over an interface that has a function the user wants to use, a corresponding interface may be classified or highlighted with identifiable color information. For example, the user may intuitively check the function the user wants to use by filling in the color, changing the color to emphasize the background, or changing the line to be thick and displaying the changed line.

The tooth fine-adjustment interface may be divided into a collision compensation interface and a collision ignoring interface according to the movement of the adjacent tooth. In FIG. 7, collision compensation interfaces 1-$a$, 1-$b$, 1-$c$, 1-$d$, 1-$e$, and 1-$f$ and collision ignoring interfaces 2-$a$, 2-$b$, 2-$c$, 2-$d$, 2-$e$, and 2-$f$ are described by being divided for each type of tooth movement interface and tooth rotation interface. As shown in FIGS. 4 to 6, the collision compensation interfaces 1-$a$, 1-$b$, 1-$c$, 1-$d$, 1-$e$, and 1-$f$ and the collision ignoring interfaces 2-$a$, 2-$b$, 2-$c$, 2-$d$, 2-$e$, and 2-$f$ may be displayed by being divided as identifiable visual information. For example, the user may intuitively divide the collision compensation interfaces 1-$a$, 1-$b$, 1-$c$, 1-$d$, 1-$e$, and 1-$f$ and the collision ignoring interfaces 2-$a$, 2-$b$, 2-$c$, 2-$d$, 2-$e$, and 2-$f$ by filling in the color, changing the color to emphasize the background, or changing the line to be thick and displaying the changed line.

The collision compensation interfaces 1-$a$, 1-$b$, 1-$c$, 1-$d$, 1-$e$, and 1-$f$ and the collision ignoring interfaces 2-$a$, 2-$b$, 2-$c$, 2-$d$, 2-$e$, and 2-$f$ may be displayed at positions symmetrical with each other with respect to a center of the guide interface. For example, the collision compensation interfaces 1-$a$, 1-$b$, 1-$c$, 1-$d$, 1-$e$, and 1-$f$ and the collision ignoring interfaces 2-$a$, 2-$b$, 2-$c$, 2-$d$, 2-$e$, and 2-$f$ may be displayed on each of an upper right end and a lower left end about an axis. Alternatively, the collision compensation interfaces 1-$a$, 1-$b$, 1-$c$, 1-$d$, 1-$e$, and 1-$f$ and the collision ignoring interfaces 2-$a$, 2-$b$, 2-$c$, 2-$d$, 2-$e$, and 2-$f$ may be displayed on each of a lower left end and an upper right end about the axis. Alternatively, the collision compensation interfaces 1-$a$, 1-$b$, 1-$c$, 1-$d$, 1-$e$, and 1-$f$ and the collision ignoring interfaces 2-$a$, 2-$b$, 2-$c$, 2-$d$, 2-$e$, and 2-$f$ may be displayed at positions horizontally symmetrical with each other or at positions vertically symmetrical with each other.

In FIG. 7, although the tooth movement interfaces and the tooth rotation interfaces are simultaneously displayed, a user selection interface that allows the user to select the collision compensation interfaces 1-a, 1-b, 1-c, 1-d, 1-e, and 1-f or the collision ignoring interfaces 2-a, 2-b, 2-c, 2-d, 2-e, and 2-f may be provided, and according to the user selection through the user selection interface, only the collision compensation interfaces 1-a, 1-b, 1-c, 1-d, 1-e, and 1-f may be displayed or only the collision ignoring interfaces 2-a, 2-b, 2-c, 2-d, 2-e, and 2-f may be displayed. In this case, since only essential interfaces are displayed on the screen, the user may be guided to make the user's manipulation easier.

When the user selects the collision compensation interfaces 1-a, 1-b, 1-c, 1-d, 1-e, and 1-f, the digital tooth setup device determines whether a collision occurs between the selected tooth 600 and the adjacent tooth. When the collision occurs, a collision direction and an overlapping amount may be calculated. In this case, whether the collision occurs may be divided as identifiable visual information and displayed, and the calculation of the collision direction and the overlapping amount may be displayed as identifiable visual information or numerical information.

When the collision occurs, the digital tooth setup device may perform compensation movement on the adjacent tooth in the same direction as the selected tooth along an arch line by the overlapping amount within a range (e.g., maxilla left, maxilla right, mandible left, or mandible right) in which the selected tooth collides with the adjacent tooth. For example, when a maxillary right central incisor (selected tooth) is moved 3 mm to the left, the maxillary right central incisor overlaps with a maxillary left central incisor on an opposite side of the maxillary right central incisor, and the incisors, canines, premolars, and molars on the left side of the maxilla left where the collision occurred compensate for an amount of collision so that all the teeth are moved 3 mm to the right.

The corresponding function is a technology for compensating for the disadvantage of the manipulator, which requires the user to individually correct the adjacent teeth that collided when fine adjustment of the individual tooth is performed using the manipulator.

Meanwhile, the configuration of the interface of FIG. 7 and the configuration and respective positions of the interfaces included in FIGS. 4 to 6 are examples for describing the present invention, but are not limited thereto, and the configuration and position of the manipulator may vary according to an angle of view seen by the user. For example, when the user adjusts the angle of view, the configuration of the manipulator may be changed to be suitable for fine adjustment at the corresponding angle.

Figure 8:
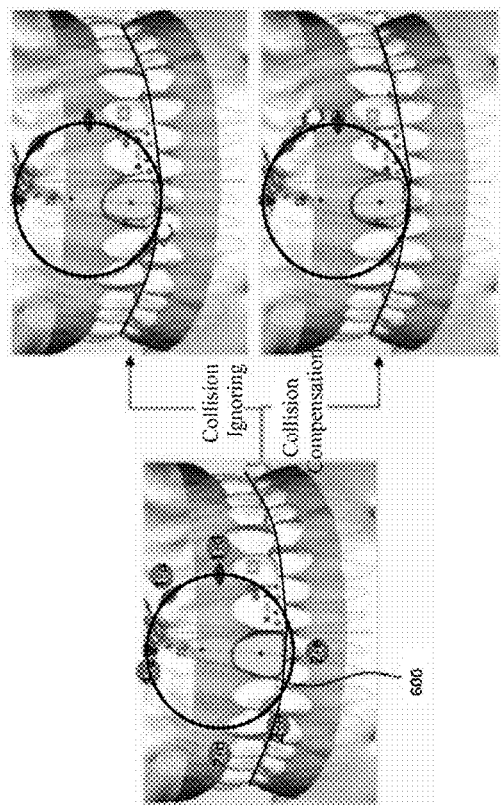
FIG. 8 is a set of views showing screens on which a collision compensation interface and a collision ignoring interface according to an embodiment of the present invention are applied to a selected tooth.

FIG. 8 is a set of views showing screens on which a collision compensation interface and a collision ignoring interface according to an embodiment of the present invention are applied to a selected tooth.

Referring to FIG. 8, a digital tooth setup device divides and displays a tooth fine-adjustment interface for movement or rotation of a selected tooth 600 into a collision compensation interface and a collision ignoring interface. In order to increase the degree of freedom in using the manipulator by a user, a collision ignoring interface for ignoring a collision of the selected tooth with an adjacent tooth is also included in the same manipulator so that the user selection is possible.

Figure 9:
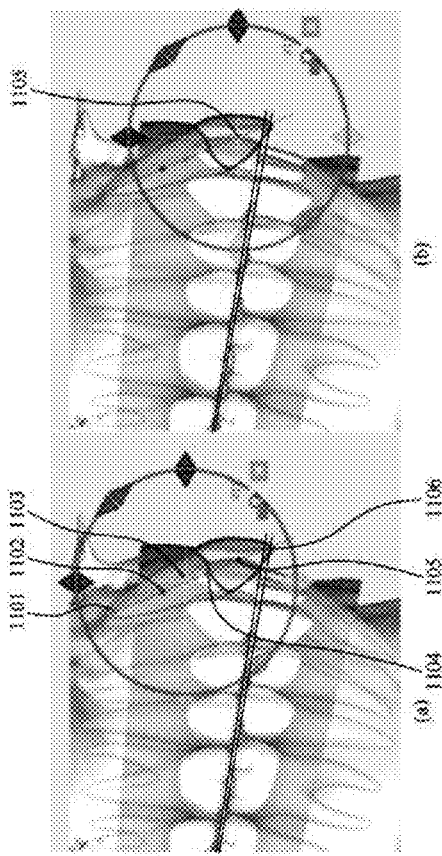
FIG. 9 is a set of views showing screens on which a rotation axis is changeable according to user selection when a tooth is rotated using a manipulator according to an embodiment of the present invention.

FIG. 9 is a set of views showing screens on which a rotation axis is changeable according to user selection when a tooth is rotated using a manipulator according to an embodiment of the present invention.

More specifically, (a) of FIG. 9 is a view showing a screen on which a position of a rotational center point of a tooth is displayed, and (b) of FIG. 9 is a view showing a screen on which a user changes the position of the rotational center point.

Referring to FIG. 9, positions of rotational center point candidates around which rotation movement will be performed to rotate the selected tooth using the manipulator may be displayed, and a predetermined rotational center point may be selected from among the rotational center point candidates by the user's manipulation. Alternatively, a basic center point among the rotational center point candidates may be preset and suggested, and changed to another rotational center point by the user's manipulation. The rotational center point candidates of the tooth may be determined using tooth axis information having the selected individual tooth. In this case, the rotational center point candidates of the tooth may be displayed as a plurality of points along a long axis of the tooth. For example, the rotational center point candidates of the tooth include a dental root tip 1101, a dental root center 1102, a dental root ⅓-point 1103, a gingiva boundary 1104, a tooth center 1105, a tooth tip 1106, and the like. Various rotation aspects of tooth are possible by supporting a plurality of rotational center point candidates of the tooth. As shown in (a) of FIG. 9, the rotational center point candidates of tooth may be displayed and a basic center point 1103 among the rotational center point candidates may be presented, and as shown in (b) of FIG. 9, the rotational center point of the tooth may be changed by the user to the tooth center 1105.

Figure 10:
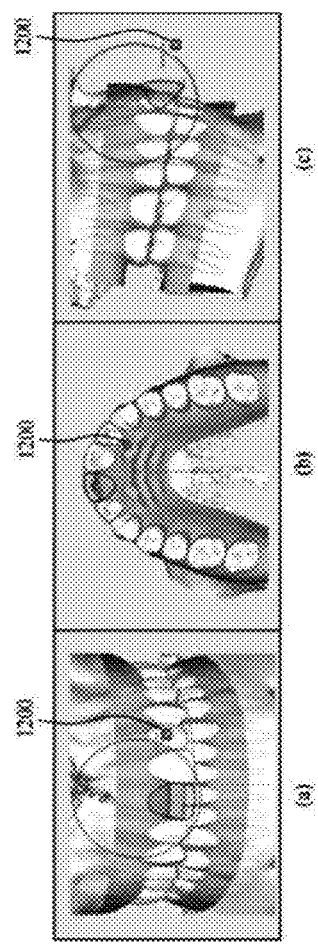
FIG. 10 is a set of views showing an example in which a tooth is extracted using an interface for tooth extraction according to an embodiment of the present invention.

FIG. 10 is a set of views showing an example in which a tooth is extracted using an interface for tooth extraction according to an embodiment of the present invention.

Referring to FIG. 10, the digital tooth setup device displays an interface 1200 for tooth extraction for a selected tooth. In this case, when the user selects the interface 1200 for tooth extraction for the selected tooth, the selected tooth is deleted and a portion in which the selected tooth is deleted is displayed as an empty space. Furthermore, the teeth may be arranged by moving or rotating the tooth by utilizing the space generated due to the tooth extraction.

The digital tooth setup device may provide at least one image of a tooth front image (in (a) of FIG. 10), a tooth occlusal surface image (in (b) of FIG. 10), and a tooth side image (in (c) of FIG. 10) for the selected tooth for the tooth extraction, and display the interface 1200 for tooth extraction in each image.

As another example, the digital tooth setup device may provide at least two images of the tooth front image (in (a) of FIG. 10), the tooth occlusal surface image (in (b) of FIG. 10), and the tooth side image (in (c) of FIG. 10) for the selected tooth for the tooth extraction together, and display the interface 1200 for tooth extraction in each image. In this case, when the tooth extraction is performed on the predetermined image through the interface 1200 for tooth extraction by the user's manipulation, a result of the tooth extraction may be displayed in real time on another image.

Figure 11:
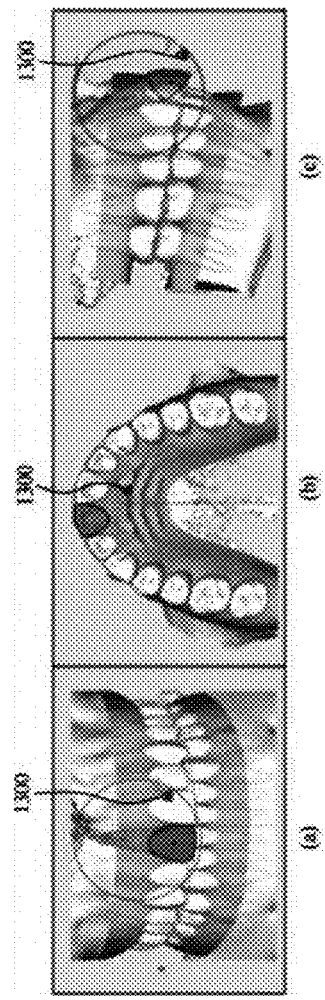
FIG. 11 is a set of views showing an example in which a tooth is fixed using an interface for tooth fixation according to an embodiment of the present invention.

FIG. 11 is a set of views showing an example in which a tooth is fixed using an interface for tooth fixation according to an embodiment of the present invention.

Referring to FIG. 11, the digital tooth setup device displays an interface 1300 for tooth fixation for the selected tooth. In this case, when the user selects the interface 1300 for tooth fixation for the selected tooth, the selected tooth is fixed, and when the user operates another interface, for example, a tooth movement interface or a tooth rotation interface, the corresponding tooth is not moved and is fixed.

The digital tooth setup device may provide at least one image of a tooth front image (in (a) of FIG. 11), a tooth occlusal surface image (in (b) of FIG. 11), and a tooth side image (in (c) of FIG. 11) for the selected tooth for the tooth fixation, and display the interface 1300 for tooth fixation in each image.

As another example, the digital tooth setup device may provide at least two images of the tooth front image (in (a) of FIG. 11), the tooth occlusal surface image (in (b) of FIG. 11), and the tooth side image (in (c) of FIG. 11) for the selected tooth for the tooth fixation together, and display the interface 1300 for tooth fixation in each image. In this case, when the tooth fixation is performed on the predetermined image through the interface 1300 for tooth fixation by the user's manipulation, a result of the tooth fixation may be displayed in real time on another image.

Figure 12:
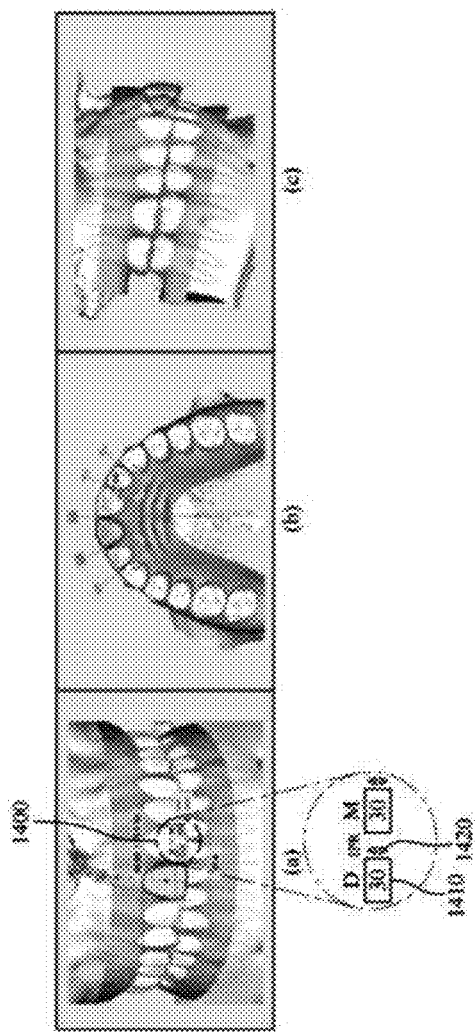
FIG. 12 is a set of views showing an example in which interproximal reduction is performed using an interface for interproximal reduction according to an embodiment of the present invention.

FIG. 12 is a set of views showing an example in which interproximal reduction is performed using an interface for interproximal reduction according to an embodiment of the present invention.

Referring to FIG. 12, the digital tooth setup device displays an interface 1400 for interproximal reduction for the selected tooth. In this case, the user may select the interface 1400 for interproximal reduction for the selected tooth to perform interproximal reduction. The interface 1400 for interproximal reduction may include a text box interface 1410 and an increase/decrease interface 1420. The user may directly input a deletion value into the text box interface 1410 or may select the increase/decrease interface 1420 to increase or decrease a reduction amount. In FIG. 12, the increase/decrease interface 1420 is positioned at the right side of the text box interface 1410, but the position of the increase/decrease interface 1420 is not limited thereto. The amount of interproximal reduction may be specified for each mesial proximal surface and distal proximal surface of the selected tooth. The user may precisely adjust the amount of interproximal reduction.

When the user inputs the amount of interproximal reduction through the interface 1400 for interproximal reduction for the selected tooth, at least one of the mesial and distal proximal surfaces of the selected tooth is deleted by the value input by the user and displayed. Further, even when the interproximal reduction is performed, the teeth may be arranged by moving or rotating the tooth in a space generated through deletion in the same way as the tooth extraction.

The digital tooth setup device may provide at least one image of a tooth front image (in (a) of FIG. 12), a tooth occlusal surface image (in (b) of FIG. 12), and a tooth side image (in (c) of FIG. 12) for the selected tooth for the interproximal reduction, and display the interface 1400 for interproximal reduction in each image.

As another example, the digital tooth setup device may provide at least two images of the tooth front image (in (a) of FIG. 12), the tooth occlusal surface image (in (b) of FIG. 12), and the tooth side image (in (c) of FIG. 12) for the selected tooth for the interproximal reduction together, and display the interface 1400 for interproximal reduction in each image. In this case, when the interproximal reduction is performed on the predetermined image through the interface 1400 for interproximal reduction by the user's manipulation, a result of the interproximal reduction may be displayed in real time on another image.

Figure 13:
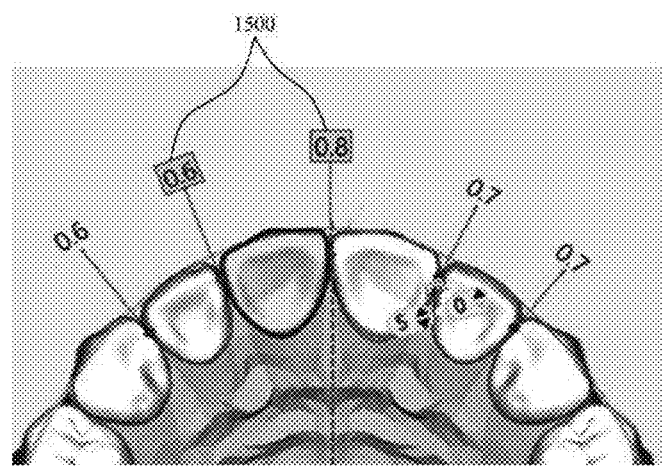
FIG. 13 is a view showing a screen on which a tooth width that is changed after interproximal reduction is performed using an interface for interproximal reduction according to an embodiment of the present invention is displayed.

FIG. 13 is a view showing a screen on which a tooth width that is changed after interproximal reduction is performed using an interface for interproximal reduction according to an embodiment of the present invention is displayed.

Referring to FIG. 13, when interproximal reduction for adjusting a tooth setup space is performed, the digital tooth setup device displays width information change information 1500 in which interproximal reduction information of the selected tooth is reflected.

Figure 14:
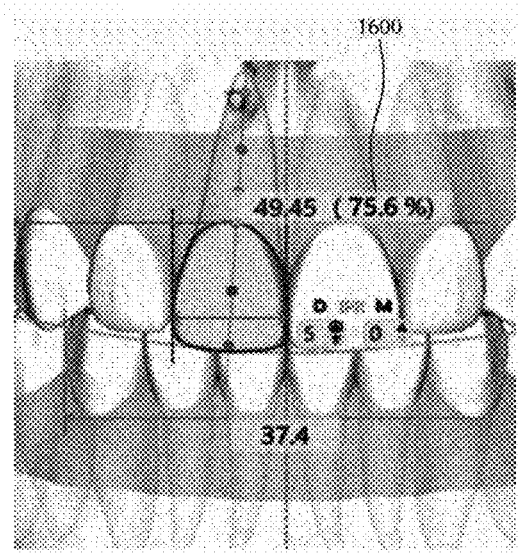
FIG. 14 is a view showing a screen on which an analysis result of a tooth width that is changed after interproximal reduction is performed using an interface for interproximal reduction according to an embodiment of the present invention is displayed.

FIG. 14 is a view showing a screen on which an analysis result of a tooth width that is changed after interproximal reduction is performed using an interface for interproximal reduction according to an embodiment of the present invention is displayed.

Referring to FIG. 14, when interproximal reduction for adjusting a tooth setup space is performed, the digital tooth setup device may display a changed tooth width analysis result 1600. For example, as shown in FIG. 14, a Bolton tooth ratio-Anterior (in the case of FIG. 14, (37.4/49.45) *100(%)) being a ratio of a tooth width of the mesial proximal surface to the distal proximal surface of the selected tooth may be calculated and displayed. In this case, it is also possible to check an occlusion relationship between the maxilla and the mandible. That is, results of prediction of the occlusal relationship and appropriate tooth size ratio may be immediately provided together with the interproximal reduction, an environment in which results expected according to the interproximal reduction can be simultaneously checked may be provided, and user convenience and the accuracy of treatment plan can be simultaneously improved.

While the present invention has been particularly described with reference to exemplary embodiments, it will be understood by those skilled in the art that various changes in form and details may be made without departing from the spirit and scope of the present invention. Therefore, the exemplary embodiments should be considered in a descriptive sense only and not for purposes of limitation. The scope of the present invention is defined not by the detailed description of the present invention but by the appended claims, and encompasses all modifications and equivalents that fall within the scope of the appended claims and will be construed as being included in the present invention.

The invention claimed is:

1. A digital tooth setup method using a digital tooth setup device, comprising the following steps of, performed by the digital tooth setup device:
   displaying dental image data;
   receiving a selection input of a predetermined tooth by a user's manipulation on the displayed dental image data;
   displaying a plurality of manipulators for at least one of a fine adjustment function and a treatment technique function on a loop-shaped guide interface around the selected tooth; and
   performing tooth setup using the plurality of manipulators,
   wherein the fine adjustment function includes at least one of tooth movement and tooth rotation,
   wherein the treatment technique function includes at least one of tooth extraction, tooth fixation, and interproximal reduction,
   wherein the loop-shaped guide interface is positioned on a loop formed to be spaced a preset distance around a position of the selected tooth,
   wherein the plurality of manipulators are displayed on the loop-shaped guide interface by being divided as functionally and visually identifiable information, and
   wherein a manipulator for tooth movement and a manipulator for tooth rotation are provided in a form of a button with an arrow direction.

2. The digital tooth setup method of claim 1, wherein, in the displaying of the manipulators, a tooth movement interface and a tooth rotation interface are divided into a collision compensation interface for compensating for a collision of the selected tooth with an adjacent tooth and a collision ignoring interface for ignoring compensation for the collision of the selected tooth with the adjacent tooth and displayed.

3. The digital tooth setup method of claim 2, wherein, in the displaying of the manipulators, the collision compensation interface and the collision ignoring interface are displayed at positions symmetrical with each other with respect to a center of the guide interface.

4. The digital tooth setup method of claim 1, wherein, in the displaying of the manipulators, at least one image of a tooth front image, a tooth occlusal surface image, and a tooth side image is displayed, and the manipulators are displayed in each image.

5. The digital tooth setup method of claim 1, wherein, in the displaying of the manipulators, at least two images of a tooth front image, a tooth occlusal surface image, and a tooth side image are displayed together, and the manipulators are displayed in each image, and
in the performing of the tooth setup using the manipulators, when the manipulator in a predetermined image is manipulated by the user's manipulation, a result of the manipulation is reflected to at least one other image in real time and displayed.

6. The digital tooth setup method of claim 1, wherein the performing of the tooth setup using the manipulators includes:
performing tooth fine adjustment on the selected tooth using the manipulators by the user's manipulation;
determining whether the selected tooth collides with an adjacent tooth during the tooth fine adjustment; and
reflecting an expected collision upon collision and compensating for an amount of movement of the adjacent tooth.

7. The digital tooth setup method of claim 6, wherein the performing of the tooth setup using the manipulators further includes visualizing and displaying a collision direction and overlapping amount when a collision occurs between the selected tooth and the adjacent tooth.

8. The digital tooth setup method of claim 1, wherein, in the performing of the tooth setup using the manipulators, when the selected tooth collides with an adjacent tooth during fine adjustment of the selected tooth, compensation movement is performed on the adjacent tooth in the same direction as the selected tooth along an arch line by an overlapping amount within a range in which the selected tooth collides with the adjacent tooth.

9. The digital tooth setup method of claim 1, wherein, in the displaying of the manipulators, positions of rotational center point candidates around which rotation movement will be performed to rotate the selected tooth are displayed, and
in the performing of the tooth setup using the manipulators, a predetermined rotational center point is selected from among the displayed rotational center point candidates by the user's manipulation and the selected tooth is rotated around the selected rotational center point.

10. The digital tooth setup method of claim 1, wherein, in the displaying of the manipulators, positions of rotational center point candidates around which rotation movement will be performed to rotate the selected tooth are displayed, and a preset basic center point among the center point candidates is suggested, and
in the performing of the tooth setup using the manipulators, the preset basic rotational center point is changed to another predetermined rotational center point among the displayed rotational center point candidates by the user's manipulation, and the selected tooth is rotated around the changed rotational center point.

11. The digital tooth setup method of claim 1, wherein, in the displaying of the manipulators, an interface for tooth extraction is displayed, and
in the performing of the tooth setup using the manipulators, when the interface for tooth extraction for the selected tooth is selected by the user's manipulation, the selected tooth is deleted and a portion in which the selected tooth is deleted is displayed as an empty space.

12. The digital tooth setup method of claim 1, wherein, in the displaying of the manipulators, an interface for tooth fixation is displayed, and
in the performing of the tooth setup using the manipulators, when the interface for tooth fixation for the selected tooth is selected by the user's manipulation, the selected tooth is fixed.

13. The digital tooth setup method of claim 1, wherein, in the displaying of the manipulators, an interface for interproximal reduction is displayed, and
in the performing of the tooth setup using the manipulators, when an amount of interproximal reduction is input through the interface for interproximal reduction for the selected tooth by the user's manipulation, at least one of mesial and distal proximal surfaces of the selected tooth is deleted by the input amount of interproximal reduction and displayed.

14. The digital tooth setup method of claim 13, wherein the interface for interproximal reduction includes at least one of a text box interface for receiving a deletion value from the user, and an increase/decrease interface for increasing and/or decreasing the amount of interproximal reduction through user selection.

15. The digital tooth setup method of claim 13, wherein the performing of the tooth setup using the manipulators further includes at least one of:
displaying the selected tooth and a tooth width that is changed after the interproximal reduction together with the interproximal reduction; and
analyzing the tooth width that is changed after the interproximal reduction and providing a result of the analysis.

16. A digital tooth setup device comprising:
an output unit configured to display a screen including dental image data;
an input unit configured to receive a user manipulation signal; and
a control unit configured to, when a selection input of a predetermined tooth is received by a user's manipulation on the dental image data displayed on the screen through the input unit, display a plurality of manipulators for at least one of a fine adjustment function and a treatment technique function on a loop-shaped guide interface around the selected tooth through the output unit, and perform tooth setup using the plurality of manipulators,
wherein the fine adjustment function includes at least one of tooth movement and tooth rotation,
wherein the treatment technique function includes at least one of tooth extraction, tooth fixation, and interproximal reduction,
wherein the loop-shaped guide interface is positioned on a loop formed to be spaced a preset distance around a position of the selected tooth, wherein the plurality of manipulators are displayed on the loop-shaped guide interface by being divided as functionally and visually identifiable information, and wherein a manipulator for tooth movement and a manipulator for tooth rotation are provided in a form of a button with an arrow direction.

\* \* \* \* \*